United States Patent [19]

Hepp

[11] Patent Number: 4,629,750

[45] Date of Patent: Dec. 16, 1986

[54] FLAME RETARDED POLYESTER RESIN WITH IMPROVED IMPACT STRENGTH

[75] Inventor: Leonard R. Hepp, Evansville, Ind.

[73] Assignee: General Electric Company, Pittsfield, Mass.

[21] Appl. No.: 705,445

[22] Filed: Feb. 25, 1985

[51] Int. Cl.$^4$ .......................... C08K 3/16; C08K 3/22; C08L 67/02

[52] U.S. Cl. .................................... 523/201; 524/281; 524/371; 524/411; 524/413; 524/504; 524/513; 524/605

[58] Field of Search ............... 524/605, 413, 411, 281, 524/504; 523/201

[56] References Cited

U.S. PATENT DOCUMENTS 3,446,766  5/1969  Taylor .................................. 260/22
4,363,899  12/1982  Shirahata ............................ 525/437

Primary Examiner—C. Warren Ivy
Attorney, Agent, or Firm—Richard J. Traverso; William F. Mufatti; Edward K. Welch, II

[57] ABSTRACT

Cuprous iodide is disclosed to improve the impact strength of flame retarded, glass reinforced, impact modified, poly(1,4-butylene terephthalate) resin molding compositions.

4 Claims, No Drawings

FLAME RETARDED POLYESTER RESIN WITH IMPROVED IMPACT STRENGTH

This invention relates to flame retarded poly(1,4-butylene terephthalate) resin molding compositions having improved impact strength. More particularly, this invention relates to flame retarded, glass reinforced, impact modified, poly(1,4-butylene terephthalate) resin molding compositions that contain an impact modifying amount of copper iodide and that optionally contain reinforcing filler and organic impact modifier.

BACKGROUND

High molecular weight linear polyesters and polymers of glycols and terephthalic or isophthalic acid have been available for a number of years. These are described inter alia in Whinfield et al, U.S. Pat. No. 3,047,539. These patents disclose that the polyesters are particularly advantageous as film and fiber-formers.

Poly(1,4-butylene terephthalate), because of its very rapid crystallization from melt, is uniquely useful as a component in such compositions. Work pieces molded from these polyester resins, in comparison with other thermoplastics, offer a high degree of surface hardness and abrasion resistance, high gloss, and lower surface friction.

One useful family of such compositions comprises those which are reinforced, e.g., with from about 5 to about 55% filamentous glass, based on the weight of glass and polyester components, and rendered flame retardant by the incorporation of a flame-retarding amount of a flame-retarding component. Another useful family of such compositions comprises those containing poly(1,4-butylene terephthalate), a flame retardant and, optionally, a reinforcing agent and a polycarbonate resin.

Experience has shown, however, that typically, articles molded from these afore-described polyester compositions are characterized by poor notched Izod impact strength. U.S. Pat. No. 4,080,354, Kramer, disclose styrene-propylene-butadiene impact modifiers for poly(1,4-butylene terephthalate) resins. U.S. Pat. No. 4,096,202, Farnham, et al, disclose core-shell impact modifiers for, among other resins, poly(1,4-butylene terephthalate) resins. Core-shell impact modifiers have become widely used in thermoplastic resins, particularly glass reinforced resins, to increase Izod impact strength. However, even though such glass reinforced, impact modified, thermoplastic resins show improved Izod impact strength, they are still rather poor in notched Izod impact strenth.

It has now been surprisingly discovered that the incorporation of cuprous iodide unexpectedly improves the impact strength of flame retarded, glass reinforced, impact modified, poly(1,4-butylene terephthalate) resin molding compositions.

DESCRIPTION OF THE INVENTION

Briefly, according to the present invention, there are provided poly(1,4-butylene terephthalate) resin molding compositions with improved impact strength comprising:

(a) thermoplastic poly(1,4-butylene terephthalate) resin;
(b) a flame retarding amount of halogenated aromatic flame retardant;
(c) antimony compound synergist;
(d) a reinforcing amount of filamentous glass;
(e) organic impact modifier; and
(f) an impact enhancing amount of cuprous iodide;
and optionally, comprising:
(g) up to 80 weight parts of another thermoplastic resin per 20 weight parts poly(1,4-butylene terephthalate) resin; and
(h) stabilizers.

The poly(1,4-butylene terephthalate) resin used in this invention is one obtained by polymerizing a glycol component at least 70 mol %, preferably at least 80 mol %, of which consists of tetramethylene glycol and an acid component at least 70 mol %, preferably at least 80 mol %, of which consists of terephthalic acid, and polyester-forming derivatives therefore.

The glycol component can contain not more than 30 mol %, preferably not more than 20 mol %, of another glycol, such as ethylene glycol, trimethylene glycol, 2-methyl-1,3-propane glycol, hexamethylene glycol, decamethylene glycol, cyclohexane dimethanol, or neopentylene glycol.

The acid component can contain not more than 30 mol %, preferably not more than 20 mol %, of another acid such as isophthalic acid, 2,6-naphthalenedicarboxylic acid, 2,7-naphthalenedicarboxylic acid, 1,5-naphthalenedicarboxylic acid, 4,4'-diphenyldicarboxylic acid, 4,4'-diphenoxyethandicarboxylic acid, p-hydroxy benzoic acid, sebacic acid, adipic acid and polyester-forming derivatives thereof.

The aromatic polyester resin used in this invention preferably has an intrisic viscosity [n] (measured in 60/40 by weight phenol/tetrachloroethane at 30° C.) of 0.3 to 1.5 dl./g.

The amount of flame-retardant additive used is not critical to the invention, so long as it is present in a proportion that is at least sufficient to reduce the flammability of the polyester resin. Those skilled in the art are well aware that the amount will vary with the nature of the resin and with the efficiency of the additive. In general, however, the amount of additive will be from 0.5 to 50 parts by weight per 100 parts of resin. A preferred range will be from about 3 to 50 parts and an especially preferred range will be from about 8 to 45 parts of additive per 100 parts of resin. Synergists, e.g., antimony oxide, will be used at about 2 to 15 parts by weight per 100 parts of resin.

Any of the conventional halogenated aromatic flame-retardants, such as decabromodiphenyl ether can be employed in the composition of the present invention. Preferred flame-retardants are aromatic carbonate homopolymers having repeating units of the formula:

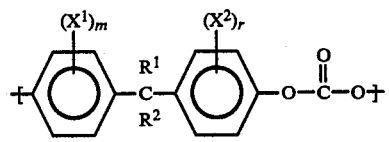

wherein $R^1$ and $R^2$ are hydrogen, (lower) alkyl or phenyl, $X^1$ and $X^2$ are bromo or chloro or mixtures thereof and m and r are from 1 to 4. It is especially preferred that $R^1$ and $R^2$ be methyl and that $X^1$ and $X^2$ be bromine. These materials may be prepared by techniques well known to those skilled in the art. Also preferred are aromatic carbonate copolymers in which from 25 to 75 weight percent of the repeating units comprise chloro- or bromo substituted dihydric phenol, glycol or dicarboxylic acid units, e.g., A. D. Wambach, U.S. Pat. No. 3,915,926. A particulary preferred flame retardant herein is an aromatic copolycarbonate of 50:50 mole ratio of bisphenol A and tetrabromobisphenol A prepared like Procedure A of U.S. Pat. No. 3,915,926.

Moreover, the flame retardants used herein, such as the aromatic polycarbonate flame retardants, can also be used with a synergist, particularly inorganic or antimony compounds. Such compounds are widely available or can be made in known ways. In preferred embodiments, the type of antimony compound used is not critical, being a choice primarily based on economics. For example, as inorganic compounds there can be used antimony oxide ($Sb_2O_3$); antimony phosphate; $KSb(OH)_6$; $NH_4SbF_6$; $SbS_3$; and the like. A wide variety of organic antimony compounds can also be used, such as antimony esters with organic acids; cyclic alkyl antimonites; aryl antimonic acids and the like. Illustrative of the organic antimony compounds, including inorganic salts of such compounds, are: KSb tartrate; Sb caproate, $Sb(OCH_2CH_3)_3$; $Sb(OCH(CH_3)CH_2CH_3)_3$; Sb polymethylene glycolate; triphenyl antimony; and the like; especially preferred is antimony oxide.

Cuprous iodide suitable for use herein may be obtained in powdered form from a number of commercial manufacturers. Of course, it is desirable to add at least as much cuprous iodide as will improve impact strength, and at most as much as will continue to improve the same. However, excessive amounts of cuprous iddide will generally degrade other properties of the polyester molding composition. Generally, it is recommended that from about 0.05 to about 10.0 and preferably from about 0.1 to about 2.0 parts by weight cuprous iodide be added for each 60 parts by weight resin and halogenated aromatic flame retardant in the composition. Suitable cuprous iodide powder for use herein is sold by Aldrich Chemical Company or Mallinckrodt Chemical Company. It is preferred that the cuprous iodide powder be a high purity or technical grade.

The filamentous glass to be employed as reinforcement in the present compositions is well known to those skilled in the art and is widely available from a number of manufacturers. For compositions ultimately to be employed for electrical uses, it is preferred to use fibrous glass filaments comprised of lime-aluminum borosilicate glass that is relatively soda-free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastic reinforcement are made by mechanical pulling. The filament diameters range from about 0.00012 to 0.00075 inch but this is not critical to the present invention.

The length of the glass filaments and whether or not they are bundled into fibers and the fibers bundled in turn to yarns, ropes or rovings, or woven into mats and the like are also not critical to the invention. However, in preparing the molding compositions it is convenient to use the filamentous glass in the form of chopped strands of from about ⅛" to about 2" long. In articles molded from the compositions on the other hand, even shorter lengths will be encountered because, during compounding considerable fragmentation will occur. This is desirable, however, because the best properties are exhibited by thermoplastic injection molded articles in which the filament lengths lie between about 0.000005" and 0.125 (⅛").

In general, best properties will be obtained if the filamentous glass reinforcement comprises from about 2.5 to about 90% by weight based on the combined weight of glass, resin, and flame retardant and preferably from about 5 to about 55% by weight. In especially preferred embodiments, the glass will comprise from about 20 to about 40% by weight based on the combined weight of glass, resin and flame retardant. Generally, for direct molding use, up to about 60% of glass can be present without causing flow problems. However, it is useful also to prepare the compositions containing substantially greater quantities, e.g., up to 80–90% by weight of glass. These concentrates can be custom blended with resins that are not glass reinforced to provide any desired glass content of a lower value.

Furthermore, the composition of the present invention further comprises an effective amount of any of the known organic impact modifiers useful for polyesters and polyester blends. These may be added to the compositions by themselves or in combination with the aforementioned aromatic polycarbonates.

The preferred impact modifiers generally comprise an acrylic or methacrylic grafted polymer of conjugated diene or an acrylate elastomer, alone or copolymerized with a vinyl aromatic compound. Especially preferred grafted polymers are the core-shell polymers of the type available from Rohm & Haas, for example Acryloid KM653, Acryloid KM330 and Acryloid KM611. In general these impact modifiers contain units derived from butadiene or isoprene, alone or in combination with a vinyl aromatic compound, or n-butyl acrylate, alone or in combination with a vinyl aromatic compound. The aforementioned impact modifiers are believed to be disclosed in Fromuth, et al., U.S. Pat. No. 4,180,494; Owens, U.S. Pat. No. 3,808,180; Farnham, et al., U.S. Pat. No. 4,096,202; and Cohen, et al., U.S. Pat. No. 4,260,693, all incorporated herein by reference. Most preferably, the core-shell impact modifier will comprise a two-stage polymer having either a butadiene or n-butyl acrylate based rubbery core and a second stage polymerized from methylmethacrylate alone or in combination with styrene. Also present in the first stage are cross linking monomers and graft linking monomers. Examples of the cross linking monomers include 1,3-butylene diacrylate, divinyl benzene and butylene dimethacrylate. Examples of graft linking monomers are allyl acrylate, allyl methacrylate and diallyl maleate.

Additional preferred impact modifiers are of the type disclosed in U.S. Pat. No. 4,292,233, incorporated by reference. These impact modifiers comprise, generally, a relatively high content of a cross-linked butadienepolymer grafted base having grafted thereon acrylonitrile and styrene.

Other suitable impact modifiers include, but are not limited to ethylene vinyl acetate, ethylene ethylacrylate copolymers, etc.

The resin component in the molding compositions of the present invention may include in addition to the poly(1,4-butylene terephthalate) resin up to 80 weight parts of other thermoplastic resins per 20 weight parts of poly(1,4-butylene terephthalate) resin. Other suitable thermoplastic resins which may be used include acrylic and methacrylic polymers (including copolymers); polyesters such as poly(ethylene terephthalate); epoxy resins; polycarbonates; polyetherimide; polyaryl ethers which include phenylene oxide based resins such as polyphenylene oxide; and blends of polyphenylene oxide and styrene resins; polyaryl ethers; polyesters; polyethylene; polyphenylene sulfides; polypropylene; polysulfones; ethylene copolymers such as ethyl vinyl acetates; and ordered aromatic copolymers, etc.

The method of blending the compositions of this invention is not critical and can be carried out by conventional techniques. One convenient method comprises blending the polyester and other ingredients in powder or granular form, extruding the blend and comminuting into pellets or other suitable shapes.

The ingredients are combined in any usual manner, e.g., by dry mixing or by mixing in the melted state in an extruder, on a heated mill or in other mixers.

By way of illustration, chopped glass (glass rovings which have been chopped into small pieces, e.g. ⅛ to 1 inch in length, and preferably less than ¼ inch in length) is put into an extrusion compounder with the polkyester resin, other ingredients, and optionally, other additive(s) to produce molding pellets. The fibers are shortened and predispersed in the process, coming out at less than 1/16 inch long. In another procedure, glass filaments are ground or milled to short lengths, and are mixed with the polyester resin and stabilizers, and, optionally other additive(s), by dry blending then either fluxed or a mill and ground, or they are extruded and chopped. The glass fibers can also be mixed with resin and additives and directly molded, e.g. by injection or transfer molding techniques.

It is always important to thoroughly free all of the ingredients, the polyester resin and other ingredients from as much water as possible.

Although it is not essential, best results are obtained if the ingredients are precompounded, pelletized and then molded. Precompounding can be carried out in conventional equipment. For example, after carefully predrying the polyester resin, other ingredients, and, optionally, other additives and/or reinforcements, a single screw extruder is fed with a dry blend of the composition, the screw employed having a long transition section to insure proper melting and the composition is pelletized. On the other hand, a twin screw extrusion machine, can be fed with resins and additives at the feed port and reinforcement down stream. In either case, a generally suitable machine temperature will be about 450° to 575° F.

The precompounded composition can be extruded and cut or chopped into molding compounds, such as conventional granules, pellets, etc. by standard techniques.

The compositions can be molded in any equipment conventionally used for thermoplastic compositions. For example, good results will be obtained in an injection molding machine, e.g. of the Van Dorn type, with conventional cylinder temperatures, e.g., 500° F. and conventional mold temperatures e.g., 150° F. If necessary, depending on the molding properties of the polyester, the amount of additives and/or reinforcing filler and the rate of crystallization of the polyester component, those skilled in the art will be able to make the conventional adjustments in molding cycles to accommodate the composition.

The compositions of this invention may be used alone as molding pellets or mixed with other polymers and may contain additional, non-reinforcing fillers, such as wood flour, cloth fibers, and the like, as well as pigments, dyes, stabilizers, plasticizers, and the like.

DESCRIPTION OF THE PREFERRED EMBODIMENTS

The following examples illustrate the preparation of certain compositions within the scope of this invention. They are not to be construed to limit the invention in any manner whatsoever. All parts, except as otherwise indicated, are by weight.

EXAMPLES 1-5

The formulations shown below were premixed in a paint shaker and extruded on a 1¾" Sterling Extruder having a barrel temperature profile of 540°0 F.–560° F.–580° F. and a die head temperature of 520° F. The extrudate was cooled through a water bath prior to pelletizing. Test parts were injection molded on a 3 oz. Van Dorn molding press with a set temperature of approximately 480° F. The resin was dried four hours at 250° F. in a forced air circulating oven prior to injection molding.

|  | 1 | 2 | 3 | 4 | 5 |
|---|---|---|---|---|---|
| PBT[1] | 34.15 | 34.05 | 33.85 | 33.65 | 33.15 |
| Glass[2] | 30.0 | 30.0 | 30.0 | 30.0 | 30.0 |
| Stabilizer[3] | 0.15 | 0.15 | 0.15 | 0.15 | 0.15 |
| Flame Retardant[4] | 9.0 | 9.0 | 9.0 | 9.0 | 9.0 |
| $Sb_2O_3$ Concentrate[5] | 4.0 | 4.0 | 4.0 | 4.0 | 4.0 |
| Mold Release Agent | 0.2 | 0.2 | 0.2 | 0.2 | 0.2 |
| Polycarbonate[6] | 10.0 | 10.0 | 10.0 | 10.0 | 10.0 |
| Impact Modifier[7] | 12.5 | 12.5 | 12.5 | 12.5 | 12.5 |
| Cuprous Iodide | 0 | 0.1 | 0.3 | 0.5 | 1.0 |
| Notched Izod Impact, ft. lbs./in. | 2.1 | 2.3 | 2.8 | 3.3 | 3.3 |
| Unnotched Izod Impact, ft. lbs./in. | 12.7 | 12.2 | 13.2 | 14.0 | 13.5 |

[1] poly(1,4-butylene terephthalate) resin, VALOX ® resin grade 295, M.V. = 1,000–1,800 poise, General Electric Company
[2] filament diameter = 0.000525 in.
[3] hindered phenol antioxidant
[4] tetrabromobisphenol oligomer with phosgene
[5] 80% $Sb_2O_3$/20% polyethylene by weight
[6] bisphenol-A polycarbonate resin, LEXAN ® resin grade 121, General Electric Company
[7] core-shell impact modifier, Acryloid KM330, Rohm and Haas Company

What is claimed is:
1. A thermoplastic molding composition comprising:
 (a) poly(1,4-butylene terephthalate) resin;
 (b) A flame retarding amount of halogenated aromatic flame retardant;
 (c) an effective amount of antimony compound synergist;
 (d) a reinforcing amount of filament glass;
 (e) an impact modifying amount of organic impact modifier; and
 (f) about 0.01 to about 2.0 parts by weight of cuprous iodide for each 60 parts by weight resin and halogenated aromatic flame retardant.
2. The molding composition of claim 1 wherein said organic impact modifier is a core-shell organic impact modifier.
3. The molding composition of claim 2 wherein said core-shell organic impact modifier has a rubbery core based on butadiene or n-butylacrylate and a shell based on methylmethacrylate alone or in combination with styrene.
4. The composition of claim 1 which additionally contains up to 80 weight parts of another synthetic resin selected from the group consisting of acrylic polymers, methacrylic polymers, polyesters, epoxy resins, polycarbonates, polyetherimides, polyaryl ethers, polyphenylene sulfides, polyethylene, polypropylene, polysulfones, blends of polyphenylene oxide and styrene resins, and ethylene copolymers, per 20 parts by weight of poly(1,4-butylene terephthalate) resin.

* * * * *